E. ROGOWSKI.
DEMOUNTABLE RIM.
APPLICATION FILED JUNE 29, 1920.
1,397,823.
Patented Nov. 22, 1921.
2 SHEETS—SHEET 2.
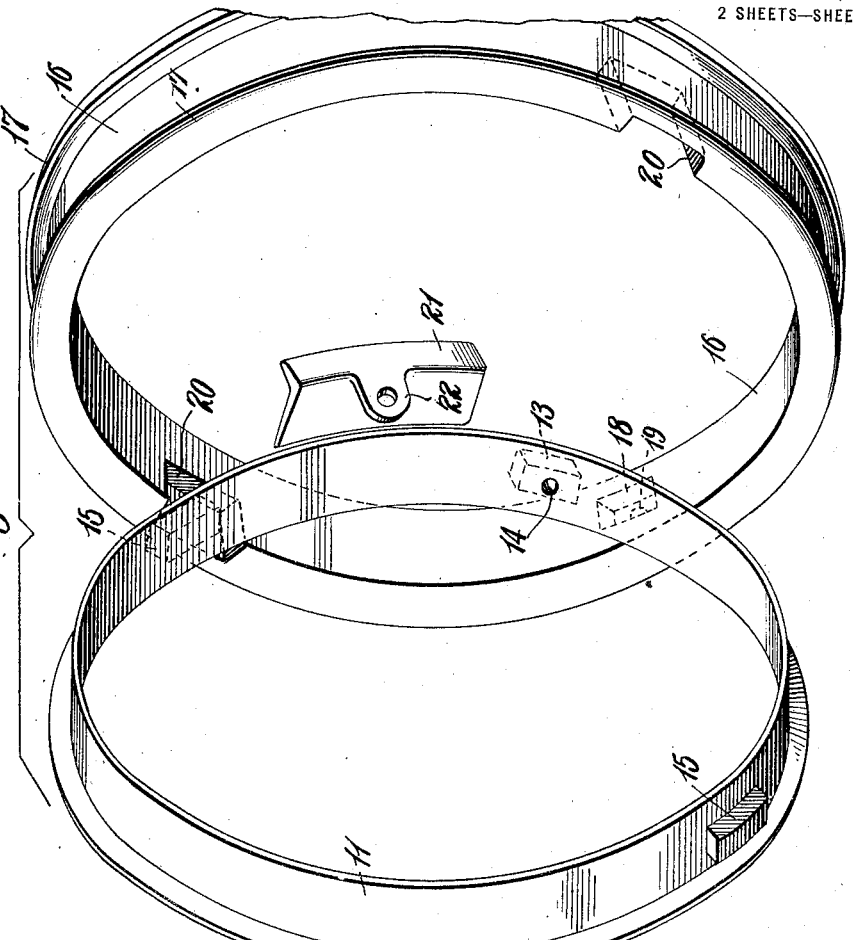
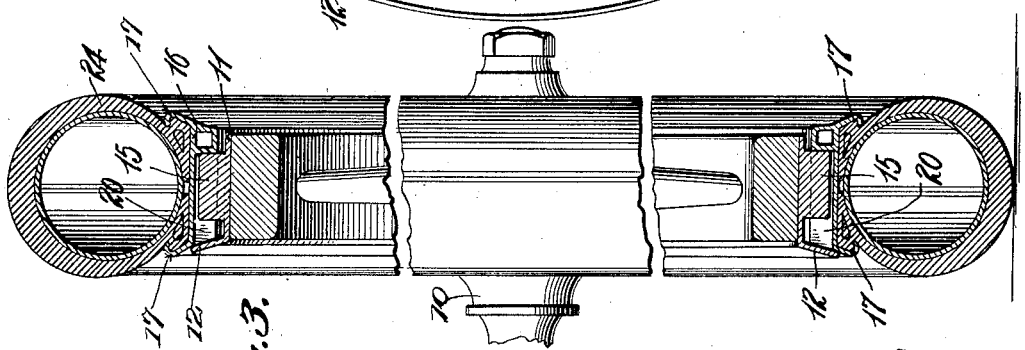
Inventor
E. Rogowski
By
Lacey & Lacey, Attorneys

UNITED STATES PATENT OFFICE.

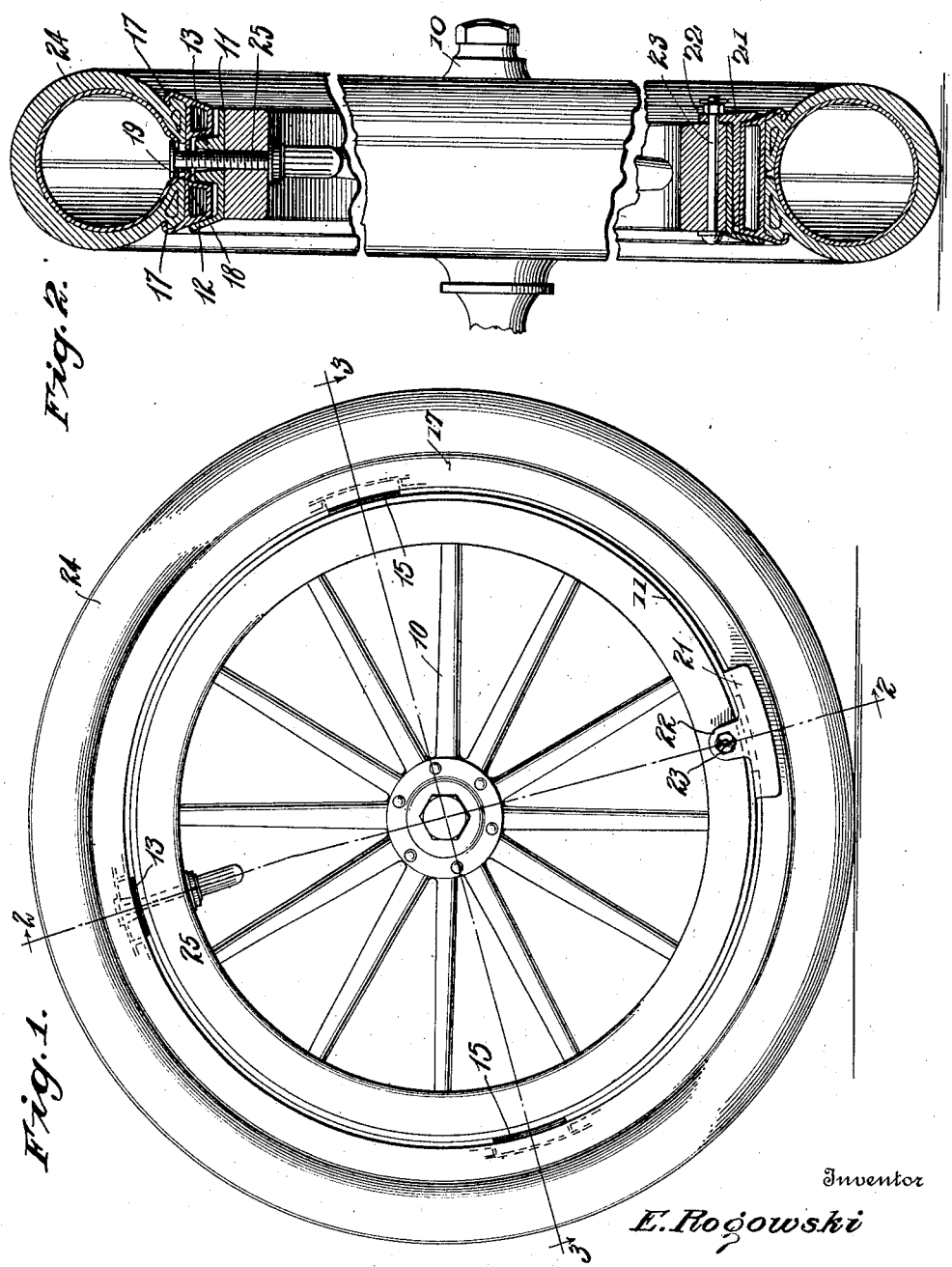

EDMUND ROGOWSKI, OF CHICAGO, ILLINOIS, ASSIGNOR OF ONE-HALF TO BERNARD FREUD, OF CHICAGO, ILLINOIS.

DEMOUNTABLE RIM.

1,397,823.

Specification of Letters Patent.   Patented Nov. 22, 1921.

Application filed June 29, 1920. Serial No. 392,811.

*To all whom it may concern:*

Be it known that I, EDMUND ROGOWSKI, citizen of the United States, residing at Chicago, in the county of Cook and State of Illinois, have invented certain new and useful Improvements in Demountable Rims, of which the following is a specification.

This invention relates to an improved demountable rim for motor vehicles and has as one of its principal objects to provide a construction wherein the outer rim band employed may be easily and quickly removed from the inner rim band of the device but wherein the outer band will normally be held securely upon the inner band.

The invention has as a further object to provide a construction wherein the outer rim band will be secured by a single wedge clamp so that, when either removing or replacing the outer band, it will simply be necessary to manipulate this one clamp.

And the invention has as a still further object to provide a demountable rim which may be readily employed in connection with substantially any conventional design of motor vehicle and which will be adapted to receive standard pneumatic tires.

Other and incidental objects will appear hereinafter.

In the drawings:

Figure 1 is a side elevation showing a motor vehicle wheel equipped with my improved demountable rim, a tire of conventional design being shown in position upon the rim, Fig. 2 is a fragmentary vertical section taken on the line 2—2 of Fig. 1, looking in the direction of the arrows, Fig. 3 is a fragmentary vertical section taken on the line 3—3 of Fig. 1, looking in the direction of the arrows, and Fig. 4 is a perspective view showing the inner and outer bands of the rim in detail.

Referring now more particularly to the drawings, I have shown my improved rim in connection with a motor vehicle wheel 10 of conventional design. In carrying the invention into effect I employ an inner rim band 11 which is tightly fitted around the felly of the wheel so as to be securely held thereon and is provided at one side with a radial laterally sloping flange 12. Projecting from the periphery of the band is a medial radial lug 13 which, as particularly shown in Fig. 4, is preferably oblong and is provided with a central opening 14 entering through the band. Formed on the periphery of the band in a plane lying at substantially right angles to the lug 13 are diametric lugs 15 which are also preferably oblong. As will be observed, the lugs 13 and 15 are equally spaced apart about the periphery of the band.

Formed to removably fit around the inner rim band 11 is an outer rim band 16. The base of this band is, as particularly shown in Fig. 2, preferably hollow and projecting from the band are side flanges 17 for receiving a tire. Formed in the rim base to open through the inner face thereof is a medial socket 18 and entering through the bottom wall of this socket is an opening 19 corresponding in diameter to the diameter of the opening 14 through the lug 13. In a plane at substantially right angles to the socket 18, the outer rim band is provided in its inner face with transversely extending slots 20. As particularly shown in Fig. 3, these slots open through the inner side edge of the base of the rim band and, at their inner ends terminate short of the outer side edge of said base. The bottom wall of the rim base is preferably pressed in to provide the socket 18 while the slots are, of course, equally spaced with respect to the socket 18 and slidably but snugly receive the lugs 15 of the inner rim band while the lug 13 of the inner band is received within said socket. At a point diametrically opposite the socket a single rim clamp 21 is employed. The base of this clamp is tapered to fit between the rim bands, while at its outer edge the clamp is provided with an upstanding flange to engage the outer edge of the base of the outer rim band. Depending from said clamp is a medial lug 22 and extending through the felly of the wheel 10 to freely fit through this lug is a clamping bolt 23 provided at its outer end with a nut which may be adjusted for advancing the clamp between the rim bands and consequently wedging the outer rim band tightly about the inner band while at the same time serving to secure the adjacent portion of the band against lateral displacement.

In the drawings, I have shown the outer band equipped with a tire 24 of conventional design. As will be observed, this tire is held by the side flanges 17 of the outer rim band while the casing 25 of the valve of the tire is received through the registering openings 14 and 19 of the inner and outer rim bands respectively. To remove the outer rim band with its tire, it is simply necessary to displace the clamp 21 when the adjacent portion of the outer rim band may be shifted laterally outward from around the inner band, the slots 20 shifting outwardly over the lugs 15. The outer rim band may then be lifted to disengage the socket 18 from the lug 13 and withdrawing the tire valve casing through the wheel felly when the outer rim band may be entirely displaced. By reversing the operation just described, the outer rim band may, of course, be again fitted in position and, as will be observed, the lugs 13 and 15 of the inner rim band in conjunction with the clamp 21 will serve to securely hold the outer rim band upon the inner band abutting the flange 14 of the inner band. I accordingly provide a construction wherein the outer band will be adequately held in place while, at the same time, the outer band may, as compared with demountable rims of conventional design, be much more easily removed or replaced.

Having thus described the invention, what is claimed as new is:

1. A device of the character described including an inner rim band having spaced lugs projecting from its periphery, an outer rim band surrounding the inner band and having a hollow base, the bottom wall of said base being pressed inwardly to provide a socket receiving one of said lugs and said wall being cut away to provide a slot opening through one side edge of the base and receiving the other of said lugs, and means binding the outer band upon the inner band.

2. A device of the character described including an inner rim band having a lug projecting from the periphery thereof and a pair of lugs also projecting from its periphery in spaced relation to the first lugs, an outer rim band surrounding the inner band and provided with a hollow base having spaced top and bottom walls, the base wall being formed with a socket receiving the first lug and also provided in spaced relation to said sockets with slots opening through one side edge of the base and receiving said second mentioned lugs, and a clamp engaging between the bands at a point substantially opposite the first lug and acting to bind the outer rim band upon the inner rim band.

3. A device of the character described including an inner rim band provided at one side thereof with a radial flange and having spaced lugs projecting from its periphery, an outer rim band surrounding the inner band and provided with a hollow base having top and bottom base walls, the bottom wall being formed with a socket receiving one of said lugs and with slots opening through the inner edge of said base and receiving the other of said lugs, and a tapered clamp engaging between the bands and acting to bind the outer band about the inner band and also hold the outer band abutting said flange.

4. A device of the character described including an inner rim band having spaced lugs projecting from its periphery, an outer rim band surrounding the inner band and provided with a hollow base having spaced top and bottom walls, the bottom wall being formed with a slot opening through one side edge of the base to slidably receive one of said lugs and in spaced relation to said slot being formed with a socket receiving another of said lugs, the slot and socket having side walls extending between and connecting the top and bottom walls of the base, and means fitting between the bands binding the outer band upon the inner band.

In testimony whereof I affix my signature.

EDMUND ROGOWSKI. [L. S.]